United States Patent [19]
Albrecht et al.

[11] Patent Number: 4,828,783
[45] Date of Patent: May 9, 1989

[54] PROCESS AND APPARATUS FOR PRODUCING HOLLOW BODIES FROM THERMOPLASTIC MATERIAL

[75] Inventors: Peter Albrecht; Wolfgang Reymann, both of Hamburg; Klaus Vogel, Barsbüttel; Hermann Werner, Hamburg, all of Fed. Rep. of Germany

[73] Assignee: Krupp Corpoplast Maschinenbau GmbH, Hamburg, Fed. Rep. of Germany

[21] Appl. No.: 10,944

[22] Filed: Feb. 5, 1987

[30] Foreign Application Priority Data

Feb. 7, 1986 [DE] Fed. Rep. of Germany ....... 3603843

[51] Int. Cl.[4] ...................... B29C 55/22; B29C 55/30
[52] U.S. Cl. .................................. 264/292; 264/296; 264/323; 425/393; 425/398
[58] Field of Search ............... 264/292, 322, 323, 296; 425/393, 397, 398; 72/348, 349

[56] References Cited

U.S. PATENT DOCUMENTS

| 3,182,475 | 5/1965 | Dilling .................................. 72/77 |
| 3,205,290 | 9/1965 | Covington, Jr. et al. ........... 264/292 |
| 3,213,663 | 10/1965 | Coan ................................. 72/285 |
| 3,217,521 | 11/1965 | Dilling ................................ 72/77 |
| 3,284,560 | 11/1966 | King et al. ......................... 264/292 |
| 3,444,715 | 5/1969 | Sellars ................................ 72/84 |
| 3,492,387 | 1/1970 | Larson .............................. 264/292 |
| 3,514,468 | 5/1970 | Sutcliffe et al. ................... 264/292 |
| 3,540,259 | 11/1970 | Hinshaw ............................. 72/465 |
| 3,564,884 | 2/1971 | Hinshaw ............................. 72/57 |
| 3,602,030 | 8/1971 | Noda .................................. 72/347 |
| 3,929,959 | 12/1975 | Findlay et al. ..................... 264/292 |
| 3,929,960 | 12/1975 | Findlay et al. ..................... 264/292 |
| 4,065,951 | 10/1978 | Lyu . |
| 4,134,949 | 1/1979 | McGregor .......................... 264/519 |
| 4,420,454 | 12/1983 | Kawaguchi et al. .............. 264/512 |
| 4,554,815 | 11/1985 | Weishalla ........................... 72/349 |
| 4,564,495 | 1/1986 | Nilsson et al. ..................... 264/291 |

FOREIGN PATENT DOCUMENTS

| 2534519 | 4/1984 | France . |
| WO86/00565 | 1/1986 | PCT Int'l Appl. . |
| 626863 | 8/1949 | United Kingdom . |
| 724251 | 10/1953 | United Kingdom . |
| 1352002 | 5/1974 | United Kingdom . |
| 2092943 | 8/1982 | United Kingdom . |

Primary Examiner—Jan H. Silbaugh
Assistant Examiner—Neil Michael McCarthy
Attorney, Agent, or Firm—Panitch Schwarze Jacobs and Nadel

[57] ABSTRACT

In the production of hollow bodies from oriented thermoplastic material, a cylindrical portion of a heated hollow preform is stretched, with a simultaneous reduction in the wall thickness thereof, at a starting temperature below the vitreous transition temperature of the material. A mandrel is positioned in the preform to support it during stretching, the outside diameter of the mandrel corresponding to the inside diameter of the preform. Directly before the mandrel is inserted into the preform the preform is subjected to re-alignment to adapt at least the cross-sectional shape of the mouth opening of the preform to the cross-section of the mandrel. The re-aligning operation is effected by inserting the preform into a sleeve adjoining a drawing ring for carrying out the stretching operation.

14 Claims, 2 Drawing Sheets

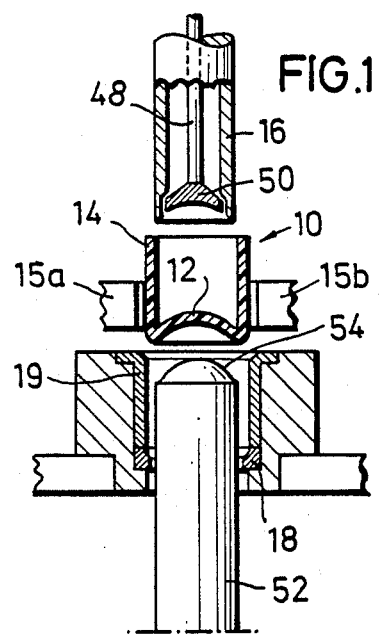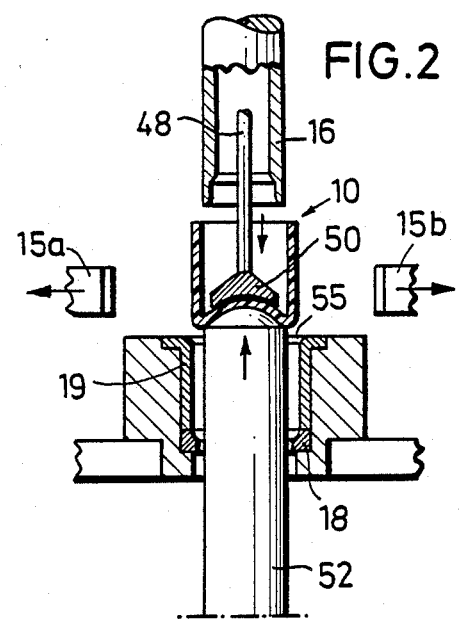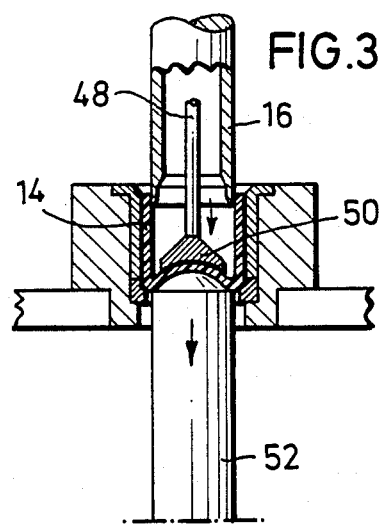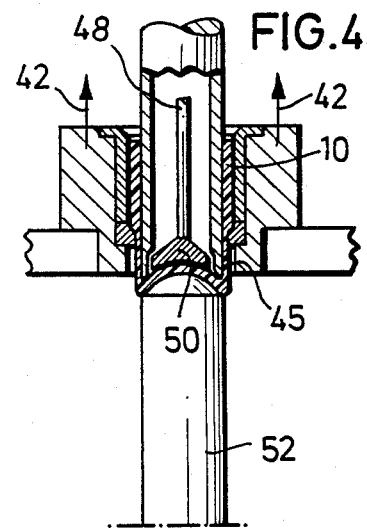

PROCESS AND APPARATUS FOR PRODUCING HOLLOW BODIES FROM THERMOPLASTIC MATERIAL

BACKGROUND OF THE INVENTION

One form of process for producing hollow bodies or articles from oriented thermoplastic material comprises taking a hollow preform which comprises a cylindrical wall portion and a bottom portion, heating the cylindrical wall portion of the preform and then subjecting it to stretching at a starting temperature which is below the vitreous transition temperature, with the wall thickness of the cylindrical portion of the preform being reduced at the same time, the stretching effect being produced by a drawing ring that has an internal support shoulder for engaging the cylindrical wall portion of the preform thereagainst. In order to support the cylindrical wall portion of the preform which is to be subjected to stretching, a mandrel is inserted into the preform, the outside diameter of the mandrel substantially corresponding to the inside diameter of the cylindrical portion which is to be stretched.

Such a process is used, preferably when employing preforms of linear polyesters, for example polyethyleneteraphthalate (PETP) or polybutyleneteraphthalate (PBTP), for example when there is a need to produce containers for containing materials under a high pressure such as for example drinks containing carbon dioxide gas. The operating procedure involved in such a process is generally such that the heated preform which is of a generally cup-like configuration and which may be produced for example by injection molding is stretched over the above-mentioned mandrel, the length of which corresponds at least to that of the preform when stretched while, as mentioned, its outside diameter substantially corresponds to the inside diameter of the preform which is substantially the same as that of the article when in the stretched condition. The stretching operation generally involves a procedure in which, starting from the bottom end of the preform, the drawing ring is moved along the cylindrical wall portion thereof, towards its free end. During that movement of the drawing ring, the wall portion along which the ring moves is stretched for example to three to four times its initial length while at the same time the wall thickness thereof is also substantially reduced. The mandrel employed within the preform performs inter alia the function of supporting the wall portion to be stretched in that way in order thereby to prevent a reduction in the diameter thereof during the stretching operation.

In order to achieve a high level of output in that procedure, it is desirable for the stretching operation to be carried out at the highest speed that can be reasonably attained in order to minimise the amount of time required for that purpose. On the other hand however it is not possible to increase the rate at which stretching is effected, to just any random value, as that involves a risk of adversely affecting the quality of the end product. An aspect which is of importance in that connection is that the temperature of the preform and the allowable speed of stretching are interrelated insofar as the stretching speed can be increased with increasing temperature. The use of higher speeds of stretching requires the preform to be heated beforehand, but the temperature thereof should be below the vitreous transition temperature.

In order to achieve the high level of output which is required for economical manufacture, the individual steps in the process must be carefully matched to each other, while between the individual working stations involved in carrying out the process, conveyor means must be provided to transport the preforms from one station to another and possibly also within the stations, in the required time sequence. Thus, disposed upstream of the working station at which the stretching operation is carried out is a temperature control or heating station at which the preform is heated to a temperature which is as high as possible while however still being below the vitreous transition temperature. When using polyethyleneteraphthalate (PETP) the temperatures involved may be for example in the region of between 65° C. and 75° C. Other temperature ranges may be used when dealing with different plastic materials. In all cases however, although the temperatures are below the vitreous transition temperature of the plastic material used, the preform when preheated in that way, prior to the stretching operation, has a certain degree of plastic deformability. When the heated preform is being handled, for example when it is being transported from the temperature control or heating station into the following working station at which the stretching operation is performed on the heated preform, the fact that the heated preform is plastically deformable means that it may suffer from undesired deformation, particularly at its end region which is remote from the bottom portion thereof, and that may result in the cylindrical wall portion becoming out-of-round so that in the next following working station it is not possible, or not easily possible, for the mandrel to be inserted properly into the heated preform. In that connection account should be taken of the fact that the free end of the mandrel, which is the leading end to be inserted into the preform, may at most be only slightly conically tapered in order to facilitate insertion thereof, as in the effective position of the mandrel, that is to say during the stretching operation using the drawing ring, the free end of the mandrel must bear snugly against the transitional portion of the preform, between the bottom portion thereof and the cylindrical wall portion, in order to provide satisfactory support in that area as it is in or close to that area that the drawing or stretching effect begins. In order for the stretching operation to be satisfactorily performed, involving forces of the order of several thousands of kN, it is essential that the drawing ring comes into proper engagement with the cylindrical wall portion of the preform in the initial phase of the stretching operation. For that purpose, it is essential for the preform to be correctly supported precisely at the above-mentioned transitional region between the bottom portion and the wall portion of the preform. That support effect could not be achieved in the required manner if the mandrel were to be tapered at its leading end to facilitate insertion into the preform.

SUMMARY OF THE INVENTION

An object of the present invention is to provide a process and apparatus for producing hollow bodies from oriented thermoplastic material, which afford a high level of output of said hollow bodies, at a high level of quality.

Another object of the present invention is to provide a process for the production of hollow bodies from oriented thermoplastic material using a preform with a mandrel which is inserted thereinto for support thereof, in which the mandrel and the preform can be properly brought into engagement with each other, under all practically occurring conditions.

Still another object of the present invention is to provide a process for the production of hollow bodies of thermoplastic material, which can be carried out in a reliable and rational manner, contributing to economic production at a high level of output.

Yet another object of the present invention is to provide a process for the production of hollow bodies from thermoplastic material using a preform wherein a mandrel can be inserted into the preform for support thereof without involving major modifications in the operating procedure.

A further object of the present invention is to provide an apparatus for producing hollow bodies from oriented thermoplastic material using a preform or parison, including means for supporting and aligning the preform or parison in the production procedure.

A still further object of the present invention is to provide an apparatus for the production of hollow bodies from thermoplastic material, including means for properly aligning the preform prior to stretching thereof to provide the finished article, without involving major structural modifications and additions in the apparatus.

In accordance with the present invention these and other objects are achieved in a process for producing hollow bodies or articles from oriented thermoplastic material, wherein the cylindrical wall portion of a hollow preform which has a bottom portion closing same is subjected to stretching at a starting temperature below the vitreous transition temperature of the thermoplastic material, with the wall thickness of the cylindrical wall portion of the preform being reduced at the same time, by means of a drawing ring which is moved along the outside of the cylindrical wall portion of the preform. To support the preform in the region thereof which is to be subjected to stretching, a mandrel is inserted into the preform, with its outside diameter corresponding to the inside diameter of the cylindrical wall portion to be stretched. Prior to the mandrel being inserted into the preform, in order to control the cross-sectional shape of the preform, if necessary, at least the end portion of the heated preform which is remote from the bottom portion thereof is subjected to a re-alignment or re-adjustment operation such that the internal cross-section of the preform corresponds at least in said end portion to the external cross-sectional dimensions and configuration of the portion of the mandrel which is to be inserted into the preform. In other words, between the operation of heating the preform and the stretching operation involving the use of the drawing ring, an additional processing step is carried out for re-alignment of the preform, if it has been subjected to improper deformation which would impede insertion of the mandrel into the preform. The additional processing operation is to be incorporated into the overall operating procedure of the process in such a way that the mandrel can be inserted into the preform immediately after the re-alignment operation has been carried out, so that there is no need to subject the preform to further handling operations which could in turn result in inadmissible deformation thereof. That effect can be achieved by the alignment operation being carried out on the heated preform by relative insertion thereof into a tubular member or sleeve, the inside dimensions of which are adapted to the external dimensions of the portion of the preform which is to be subjected to the alignment effect. During the operation of inserting the preform into the tubular member or sleeve, it is readily possible for the preform to be moved into the end position in which the preform and the drawing ring occupy the relative positions required for the commencement of the stretching operation. During insertion into the tubular member or sleeve, the preform may be held at its bottom portion between a holding member which bears against the bottom portion of the preform at the underside thereof, and a clamping member which bears against the bottom portion at the top side thereof. As the bottom portion of the preform is not subjected to stretching, the bottom portion is normally at a temperature at which there is no real fear of inadmissible deformation occurring.

In accordance with a further feature of the invention, the mandrel may be inserted into the preform while the latter is in the tubular member or sleeve.

In an advantageous feature of the present invention, the wall portion of the preform, during the re-alignment operation, is kept at a temperature which substantially corresponds to the processing temperature employed during the drawing operation. That can be readily achieved by suitably heating the tubular member or sleeve and/or the mandrel. The advantage of that procedure is that it is possible for the preform to be maintained at its working temperature over a prolonged period of time while it is in the sleeve, for example in the event of the operating procedure of the process being interrupted for some reason, as for example due to a fault in the equipment, so that after the fault has been remedied, the operating procedure can be continued again without the preform first having to be removed from the working stations in which the preform alignment operation and possibly also the preform stretching operation are effected, for the purposes of heating the preform back up to the necessary temperature.

In another aspect of the present invention, apparatus for carrying out the process of the invention comprises a drawing ring for moving along the outside of the heated preform in order thereby to produce stretching thereof, and a mandrel which is arranged within the preform to support the cylindrical wall portion thereof which is to be stretched by the movement of the drawing ring. The outside diameter of the mandrel substantially corresponds to the inside diameter of the cylindrical portion of the preform which is to be stretched. Associated with the drawing ring is a tubular member or cylindrical sleeve means which extends in coaxial relationship with respect to the drawing ring, for re-alignment of the heated preform prior to the stretching operation. The inside diameter or transverse dimension of the sleeve substantially corresponds to the desired outside diameter or transverse dimension of the portion of the preform which is to be stretched, while the length of the sleeve corresponds to the axial dimension of the preform in the unstretched condition.

Advantageously, the sleeve has a conical entry portion for insertion of the preform into the sleeve in a simple manner.

A particularly desirable construction is one in which the sleeve directly adjoins the drawing ring. That arrangement gives the advantage that when the preform is inserted into the sleeve, the preform is brought into the position for the stretching operation using the drawing ring, in the same movement. The sleeve and the drawing ring may represent a structural unit so that they may also be carried by a common mounting means.

The above-mentioned clamping member which is of smaller diameter than the mandrel and which bears against the top surface of the bottom portion of the preform during insertion thereof into the sleeve is advantageously arranged to be axially displaceable within the mandrel relative thereto, extending coaxially with respect to the sleeve in its operating position. Such an arrangement gives the advantage that the clamping member is first introduced into the preform whereupon, after the preform has been moved into its position in the sleeve, the mandrel is inserted into the preform, relative to the clamping member which thus remains in its operative position. The mandrel needs to be hollow in order to be able to accommodate the clamping element in that case.

Further objects, features and advantages of the teachings of the present invention will be apparent from the following description of a preferred embodiment.

BRIEF DESCRIPTION OF THE DRAWINGS

FIGS. 1 through 4 are views in diagrammatic form of the successive steps involved in aligning a preheated preform, up to the commencement of the preform stretching operation.

DESCRIPTION OF THE PREFERRED EMBODIMENT

Figure 5:
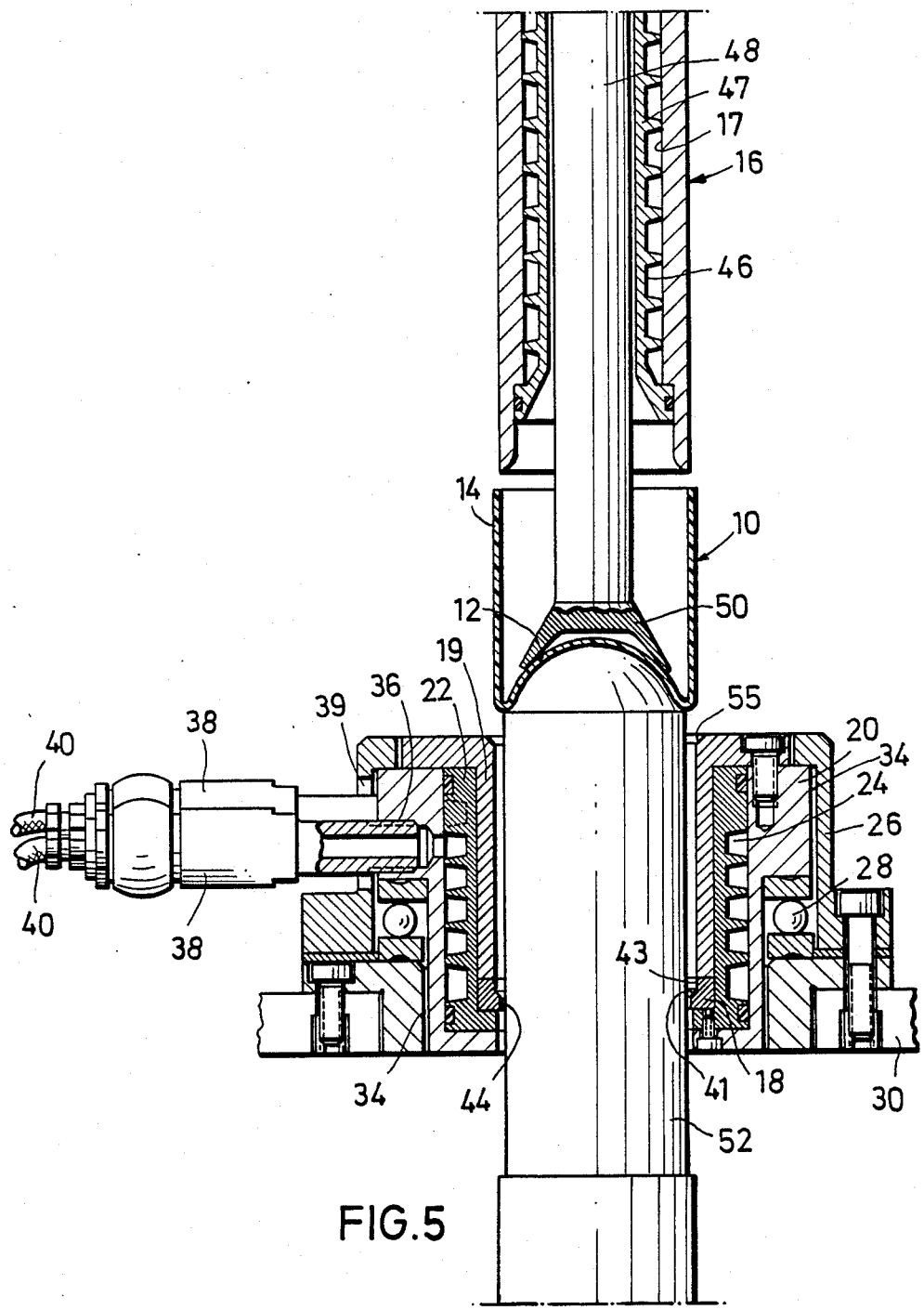
FIG. 5 is a view on an enlarged scale and in longitudinal section through an arrangement for aligning and stretching a preform.

Referring to FIGS. 1 through 3 and FIG. 5, shown therein is a preform 10 of thermoplastic material, which is of a generally cup-like configuration, comprising a bottom portion 12 which is curved inwardly in relation to the preform, that is to say upwardly in the drawing, and an adjoining substantially cylindrical wall portion 14. In order to improve the mechanical properties of the end product to be manufactured, the cylindrical wall portion 14 is subjected to stretching in the direction of its longitudinal axis in such a way that for example the wall thickness of the cylindrical portion 14 is reduced to about one third of its initial thickness.

The preform 10 which is produced for example by injection molding is firstly heated in a temperature control or heating station (not shown) in such a way that at any event the wall portion 14 is raised to the temperature required for the stretching operation. The heated preform 10 is then moved by a gripper comprising first and second gripper members 15a and 15b into the working station shown in FIGS. 1 through 5 in which the preform 10 is first aligned or adjusted in respect of its configuration, and then stretched. At the end of the transportation movement from the heating station to the working station of FIGS. 1 through 5, the preform is firstly in the condition shown in FIG. 1 in which it is disposed above a drawing arrangement comprising a drawing ring 18, with the preform still being held by the gripper members 15a and 15b.

As will be seen from the drawings, a tubular member or sleeve 19 is arranged in such a position as to extend axially away from the drawing ring 18, in coaxial relationship therewith. The inside diameter or transverse dimension of the sleeve 19 corresponds to the desired outside diameter of the preform 10 while the axial dimension of the sleeve 19 corresponds to the axial dimension of the preform 10. The drawing ring 18 and the sleeve 19 which form a structural unit are arranged in a shell-like common holder 20 as shown in FIG. 5, with the interposition of an annular component as indicated at 22. The inside peripheral surface of the holder 20, with the annular component 22, defines a passage system as indicated generally at 24 for a cooling and/or heating agent. The unit consisting of the members 18, 20 and 22 which are a precise fit together is arranged within a housing 26 and mounted by way of a ball bearing assembly 28 on a mounting bracket member 30 to which the housing 26 is fixed. The mounting member 30 is arranged to be movable in a vertical direction. FIG. 5 further shows that the holder 20 is fitted into the housing 26 in such a way as to leave an annular gap therearound. As a result, the drawing ring 18 with the sleeve 19 and the holder 20 and the ring 22 are movable in a horizontal direction by a given amount which is governed by the width of the above-mentioned annular gap, as indicated at 34 in FIG. 5, so that the above-mentioned components 18, 19, 20 and 22 are mounted floatingly in the housing 26.

The holder 20 is provided with two approximately radially extending apertures therethrough, one of the apertures being indicated at 36 in FIG. 5. Both the apertures open into the passage system 24. Screwed into each of the apertures, as shown in relation to the aperture 36, is a connecting member 38, each of which is connected to a respective hose or tube 40. The connecting members 38 pass through a substantially radially extending aperture 39 in the wall of the housing 26, the transverse dimension of the aperture 39 being such that the connecting members 38 can follow any movements of the holder 20 and therewith the drawing ring 18 and the sleeve 19. The hoses or tubes 40 carry the feed and discharge flows of the cooling and/or heating agent.

On its inside, the drawing ring 18 has a peripherally extending support shoulder referenced at 41 in FIG. 5. The support shoulder 41 is of a conical or tapering configuration in such a fashion that the inside diameter of the shoulder 41 decreases in the opposite direction to the drawing direction indicated at 42 in FIG. 4. The support shoulder 41 joins two regions of different inside diameters in the drawing ring 18. The region of larger inside diameter is indicated at 43 in FIG. 5 while the region of smaller inside diameter is shown at 44 in FIG. 5. In the larger-diameter region 43 which is thus above the support shoulder 41, the inside diameter is such that it is slightly larger than the outside diameter of the cylindrical wall portion 14 of the preform 10 in the unstretched condition. That also applies in regard to the sleeve 19 whose inside diameter is at least approximately equal to the inside diameter in the region 43 of the drawing ring 18 above the shoulder 41. In the region 44 of the drawing ring which is beneath the support shoulder 41, the inside diameter thereof is such that it is slightly larger than the outside diameter than the portion 45 of the preform 10, which has already been subjected to stretching, as shown in FIG. 4.

The operating station illustrated also includes a hollow mandrel 16 which is internally provided with an annular insert 47 which is fixed in position therein and which, jointly with the internal wall surface 17 of the mandrel 16, defines a passage 46 for a cooling and/or heating agent. Guided within the annular insert 47 is an auxiliary mandrel 48 which is axially displaceable with respect to the mandrel 16 and which at its lower end carries a clamping member 50 which is substantially adapted or matched to the shape of the bottom portion 12 of the preform 10 and is of smaller diameter than the mandrel 16.

The operating station illustrated also includes an axially displaceable bottom ram or punch member 52 which, when the preform is in the operating station, is disposed beneath the preform. The free or upward end of the member 52 in FIG. 5 is substantially adapted or matched to the configuration of the bottom portion 12 of the preform. The outside diameter of the member 52 is smaller than the smallest outside diameter of the drawing ring 18.

Starting from the position of the components relative to each other, as illustrated in FIG. 1, in which the heated preform 10 is still being held by the gripper members 15a and 15b in a position in which it is disposed axially with respect to the mandrel 16 positioned at a spacing thereabove, the sleeve 19, the drawing ring 18 and the lower punch or ram member 52, the auxiliary mandrel 48 with the clamping member 50 at the bottom end thereof is firstly moved downwardly into the preform until the clamping member 50 comes to bear against the inside or upwardly facing surface of the bottom portion 12 of the preform, and the member 52 is displaced upwardly until the end face 54 thereof comes to bear against the outside or downwardly facing surface of the bottom portion 12. During such movements the mandrel 16 initially remains in its illustrated position above the preform 10. After the preform 10 has been fixed in position by the co-operation of the clamping member 50 and the member 52, the gripper members 15a and 15b are opened, as shown diagrammatically in FIG. 2. The auxiliary mandrel 48 and the member 52 are then moved synchronously downwardly, entraining the preform 10, into the position shown in FIG. 3. In the course of that downward movement, the preform 10 is introduced into the sleeve 14 and is restored to the required circular cross-sectional configuration, thereby reversing any deformation which may have occurred in the preform, resulting in it becoming out-of-around, due to handling thereof in the course of the preceding heating and transportation steps.

As soon as the preform 10 has reached the position shown in FIG. 3 in which it is disposed within the sleeve 19 over the entire axial length of the preform, the mandrel 16 can then be moved downwardly and engaged into the preform. The inside dimensions of the mandrel 16 at its free end and the dimensions of the clamping member 50 are such that the end face of the hollow mandrel 16, which is adapted or matched to the configuration of the preform, is brought into a position of bearing against the inside surface of the transitional region of the preform between the bottom portion 12 and the wall portion 14 thereof, to provide a support effect at that location, without however the clamping member 50 which remains in contact with the bottom portion 12 being in the way of such movement of the mandrel 16.

FIG. 5 in particular clearly shows that the inside diameter of the sleeve 19 is scarcely larger than the outside diameter of the preform 10. The operation of inserting the preform 10 into the sleeve 19 is facilitated by the sleeve 19 having a conical entry portion 55 at its upward end. Added to that is the fact that the wall portion 14 of the preform 10 is generally of such a configuration as to taper outwardly in an upward direction, in a very slightly conical configuration with a cone angle of the order of 0.5°. That conical configuration serves to facilitate removal of the preform from an injection molding mold when the preform is produced by injection molding. At any event the result of that conical configuration is that the diameter of the preform 10 at its upper open end is slightly larger than at its end which has the bottom portion 12. Accordingly, with the sleeve 19 being of a cylindrical configuration, the upper end region of the preform 10 is subjected to a greater force tending to cause the upper end region of the preform 10 to assume a circular cross-sectional configuration, than the bottom end region of the preform. That takes account of the fact that, in regard to inserting the mandrel 16 into the preform, it is essentially only the initial phase of the insertion operation that is critical. As soon as the end face of the hollow mandrel 16 is at a position below the upper edge of the preform 10, within the preform, any irregularities or non-uniformities that may still exist in regard to the cross-sectional shape of the wall portion 14 of the preform would be compensated for and eliminated by the downwardly moving mandrel 16.

Although, when the preform is introduced into the sleeve 19, the forces which produce the re-aligned configuration of the preform only act on the outer surface of the wall portion 10, at the same time that also causes corresponding shaping of the inner wall surface of the wall portion 14. As the wall thickness or gauge of the wall portion 14 can be produced in a uniform and accurate fashion, particularly when the preform 10 is produced by injection molding, the forces acting on the outside of the wall portion 14 to affect the cross-sectional shape thereof also produce the desired effect in regard to the cross-sectional shape of the opening in the preform into which the mandrel 16 is to be fitted.

As the drawing ring 18 and the sleeve 19 are mounted floatingly by virtue of the gap 34 in the housing 26, as mentioned above, it is not possible to exclude the possibility that, in the working station illustrated for example in FIG. 5, those members may be disposed in an eccentric position in which therefore they are laterally displaced with respect to the joint axial centre line of the mandrel 16, the preform 10 and the bottom member 52. The step of inserting the preform 10 into the sleeve 19 also causes positive centering of the members 18 and 19, in particular also due to the effect of the conical entry portion 55 of the sleeve 19. Accordingly, the drawing ring 18 is guaranteed to be in the correct starting position relative to the preform 10 for the next following operation which involves stretching of the preform by the movement of the drawing ring 18, and there is no need to take particular steps to ensure correct positioning of the drawing ring 18 and the preform 10 in that way.

Moreover, it will be readily appreciated, in particular from the illustrated succession of operations involved in the operating procedure, that the step of re-aligning or re-configuring the preform 10 to obviate deformation which may have occurred therein in a preceding operation does not require a separate working operation as the alignment step is carried out in the course of a working operation which is required in any case, in order to put the preform 10 and the drawing ring 18 in the correct relative starting positions required for the stretching operation to be performed.

The heating systems associated with the mandrel 16 and the sleeve 19, as described above, may serve to keep the temperature of the preform at the optimum value for the drawing operation, both before and during same. With the components in the position shown in FIG. 3, in the event of a fault in the equipment for handling and processing the preform, the preform could remain in the sleeve, even for a prolonged period of time, without the temperature thereof suffering from a marked drop.

FIG. 4 shows the apparatus with the preform 10 therein, after the commencement of the stretching operation, in the course of which the structual unit carried by the mounting member 30 is moved upwardly with respect to the mandrel 16 and the bottom member 52 as well as the preform 10 which is thus held between the components 16 and 52.

It will be appreciated that in relation to that movement, as also in relation to other movements as described above, it is possible to provide for reversal of the movements involved, for example in this particular case in such a way that the preform 10 with the member 16 and 52 holding it in position may be moved downwardly with respect to the mounting member 30 which thus remains stationary, and with respect to the drawing ring 18 which is carried thereby. The equipment may also be such as to provide for simultaneous movements in opposite directions of the preform 10 and the drawing ring 18, and similarly in regard to the operation of inserting the mandrel 16 into the preform 10.

It will be appreciated that the above-described process and apparatus for producing hollow bodies or articles from oriented thermoplastic material has been set forth solely by way of example of the teachings of this invention and that various modifications and alterations may be made therein without thereby departing from the spirit and scope thereof.

What is claimed is:

1. A process for producing hollow bodies of oriented thermoplastic material comprising the steps of subjecting a hollow preform having a cylindrical wall portion and a bottom portion closing the cylindrical wall portion to stretching in said wall portion at a starting temperature below the vitreous transition temperature of the thermoplastic material, with wall thickness of said wall portion being reduced at the same time in the stretching operation, by means of a drawing ring provided with a support shoulder engaging said wall portion, and mandrel means within the preform to support said wall portion, the outside diameter of said mandrel means substantially corresponding to the inside diameter of said wall portion, wherein prior to insertion of the mandrel means into said preform, said preform is held at its bottom portion between a holding means which bears against said bottom portion of said preform at the exterior thereof and a clamping means which is disposed interiorly of and coaxially with said mandrel means and which bears against said bottom portion of said preform at the interior thereof, and at least an end part of said wall portion of said heated preform remote from said bottom portion is subjected to an aligning operation to ensure that the internal cross-section of at least said end part of the preform corresponds to the external cross-sectional dimensions of a portion of the mandrel means subsequently inserted into said preform, the aligning operation including the step of inserting said held preform, bottom portion of the preform first, into a sleeve means wherein the internal configuration of the sleeve means is adapted to the desired external configuration of said end part of the preform.

2. A process as set forth in claim 1 wherein during the operation of inserting said preform into said sleeve means said preform is moved into an end position in which the preform and said drawing ring take up the relative positions with respect to each other necessary for beginning the stretching operation.

3. A process as set forth in claim 1 wherein during the operation of inserting said preform into said sleeve means said preform is held at its bottom portion between a holding means which bears against said bottom portion at the underside thereof and a clamping means which bears against said bottom portion at the top side thereof.

4. A process as set forth in claim 1 wherein said mandrel means is inserted into said preform while same is in said sleeve means.

5. A process as set forth in claim 1 wherein said wall portion of the preform is maintained during the aligning operation at a temperature substantially corresponding to the processing temperature of the stretching operation.

6. Apparatus for the production of hollow bodies of oriented thermoplastic material from a heated preform comprising a cylindrical wall portion and a bottom portion closing the cylindrical wall portion, including a drawing ring internally provided with a conically extending support shoulder adapted to engage the outside surface of said wall portion for stretching said wall portion at a starting temperature below the vitreous transition temperature of said material, with the wall thickness of said wall portion being reduced at the same time during the stretching operation, mandrel means adapted to be arranged within said wall portion for supporting the wall portion during stretching, the outside diameter of the mandrel means substantially corresponding to the inside diameter of said wall portion to be stretched, cylindrical sleeve means adapted to receive said preform for holding at least an end part of said wall portion remote from said bottom portion in a correct configuration to receive said mandrel, said sleeve means being in coaxial relationship with the drawing ring and disposed upstream of said drawing ring in the direction in which said preform is introduced into said sleeve means, wherein the inside diameter of the sleeve means substantially corresponds to the desired outside diameter of said wall portion of the preform; and means for inserting a preform into the sleeve means to subsequently receive the mandrel means, said means for inserting comprising a holding means which bears against said bottom portion of said preform at the exterior thereof and a clamping means which is disposed interiorly of and coaxially with said mandrel means and which bears against said bottom portion of said preform at the interior thereof.

7. Apparatus as set forth in claim 6 wherein said sleeve means has a conical entry means for relative insertion of the preform thereinto.

8. Apparatus as set forth in claim 6 wherein said drawing ring and said sleeve means are carried by a common mounting means.

9. Apparatus as set forth in claim 6 wherein the inside diameter of said sleeve means is at least substantially equal to the largest diameter of said drawing ring above said support shoulder thereof.

10. Apparatus as set forth in claim 6 wherein said clamping means is further in operative association with said mandrel means for holding said preform in position to receive said mandrel means, said mandrel means being at least partially hollow and said clamping means being axially displaceable relative to said mandrel means between a rest position within same and an operating position of extending from said mandrel means in coaxial relationship with respect to the sleeve means.

11. Apparatus as set forth in claim 6 and further including heating means for heating said sleeve means.

12. Apparatus as set forth in claim 6 and further including heating means for heating said mandrel means.

13. Apparatus as set forth in claim 6 wherein said mandrel has an axial free end for insertion into the preform, the free end being at most only slightly conically tapered to facilitate insertion of the free end in the preform and to support a transitional portion of a preform between the wall portion and the bottom portion of the preform during stretching.

14. In a process for the production of a hollow body of oriented thermoplastic material, comprising: taking a hollow preform including a cylindrical wall portion having first and second ends and a bottom portion closing said wall portion at the first end thereof; heating said preform to a temperature below the vitreous transition temperature of the thermoplastic material; inserting a support mandrel into said hollow preform to support at least said wall portion from the interior thereof; and subjecting said preform to a stretching operation in said wall portion by means of a draw ring which reduces the wall thickness of said wall portion of said preform adjacent said bottom portion and towards said second end of said wall portion, the improvement that provides that prior to insertion of said mandrel into said preform said preform is held at its bottom portion between a holding means which bears against said bottom portion of said preform at the exterior thereof and a clamping means which is disposed interiorly of and coaxially with said mandrel means and which bears against said bottom portion of said preform at the interior thereof, and at least an end part of said wall portion at said second end thereof is subjected to a configuration operation effected by applying a configuration force to the outside surface of said end part of said wall portion of said preform thereby to ensure that the internal configuration of at least said end part at least substantially corresponds to the external configuration of the portion of the mandrel which is first inserted into said end part of said wall portion of said preform, said configuration force occurring as a result of inserting said held preform into a sleeve means arranged coaxially with said draw ring and upstream of said draw ring in the direction in which said preform is introduced into said sleeve means.

* * * * *